United States Patent
Nambara

(10) Patent No.: US 10,663,723 B2
(45) Date of Patent: May 26, 2020

(54) HEAD-UP DISPLAY DEVICE

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/078,093

(22) PCT Filed: Jan. 13, 2017

(86) PCT No.: PCT/JP2017/000942
§ 371 (c)(1),
(2) Date: Aug. 21, 2018

(87) PCT Pub. No.: WO2017/145558
PCT Pub. Date: Aug. 31, 2017

(65) Prior Publication Data
US 2019/0056588 A1  Feb. 21, 2019

(30) Foreign Application Priority Data

Feb. 23, 2016  (JP) .................... 2016-032259
Apr. 13, 2016  (JP) .................... 2016-080579

(51) Int. Cl.
*G02B 27/01*   (2006.01)
*B60K 35/00*   (2006.01)
(Continued)

(52) U.S. Cl.
CPC .......... *G02B 27/0101* (2013.01); *B60K 35/00* (2013.01); *G02B 17/0621* (2013.01);
(Continued)

(58) Field of Classification Search
CPC .............. B60K 35/00; B60K 2370/334; B60K 2370/33; B60K 2370/1529;
(Continued)

(56) References Cited

U.S. PATENT DOCUMENTS

2014/0268359 A1* 9/2014 Yuki .................. G02B 27/0101
                                                        359/631
2016/0209650 A1  7/2016 Kuzuhara
(Continued)

FOREIGN PATENT DOCUMENTS

JP   2010-153239 A   7/2010
JP   2015018099 A    1/2015
(Continued)

OTHER PUBLICATIONS

U.S. Appl. No. 16/078,076, filed Aug. 21, 2018, Nambara.

*Primary Examiner* — Hoan C Nguyen
(74) *Attorney, Agent, or Firm* — Harness, Dickey & Pierce, P.L.C.

(57) ABSTRACT

A head-up display device reflects a display light on a projection member to display a virtual image. A light condensing unit causes condensation and collimates an illumination light from a light source unit. A liquid crystal element includes forms an image illuminated with the illumination light. The liquid crystal element emits the display light of the image in a light flux form in an emission direction corresponding to an incident direction of the illumination light. A positive optical element has a positive refractive power. A negative optical element has a negative refractive power. Both of the optical elements are located on the optical path and guide the display light from the liquid crystal element toward the projection member to enlarge a virtual image.

(Continued)

The negative optical element on the optical path is located closer to the liquid crystal element than the positive optical element.

8 Claims, 10 Drawing Sheets

(51) Int. Cl.
*G02F 1/13357* (2006.01)
*G02B 19/00* (2006.01)
*G02B 17/06* (2006.01)
G02F 1/1335 (2006.01)
G02F 1/1343 (2006.01)
G02F 1/137 (2006.01)

(52) U.S. Cl.
CPC ..... *G02B 17/0642* (2013.01); *G02B 19/0014* (2013.01); *G02B 19/0061* (2013.01); *G02F 1/133606* (2013.01); *B60K 2370/1529* (2019.05); *B60K 2370/23* (2019.05); *B60K 2370/334* (2019.05); *G02B 2027/0118* (2013.01); *G02B 2027/0123* (2013.01); *G02F 1/137* (2013.01); *G02F 1/13439* (2013.01); *G02F 1/133504* (2013.01); *G02F 1/133514* (2013.01); *G02F 1/133528* (2013.01); *G02F 2001/133607* (2013.01)

(58) Field of Classification Search
CPC .......... B60K 2370/23; G02F 1/133603; G02F 1/133611; G02F 1/133606; G02F 2001/133613; G02F 1/137; G02F 2001/133607; G02F 1/133514; G02F 1/13439; G02F 1/133504; G02F 1/133528; F21V 5/008; G02B 2027/0118; G02B 27/01; G02B 5/0278; G02B 27/0101; G02B 19/0066; G02B 19/0028; G02B 19/0014; G02B 17/0621; G02B 19/0101; G02B 17/0642; G02B 2027/0123; G02B 19/0061; G09G 2380/10; G09G 3/02
See application file for complete search history.

(56) References Cited

U.S. PATENT DOCUMENTS

| | | |
|---|---|---|
| 2016/0266383 A1 | 9/2016 | Liu |
| 2016/0299342 A1 | 10/2016 | Asai |
| 2017/0146798 A1* | 5/2017 | Nambara ............... B60K 35/00 |
| 2017/0184843 A1* | 6/2017 | Kuzuhara .......... G02B 27/0101 |
| 2017/0199381 A1* | 7/2017 | Kuwabara .............. B60K 35/00 |
| 2017/0299862 A1* | 10/2017 | Yamaguchi ........... B60K 35/00 |
| 2019/0137767 A1* | 5/2019 | Nambara ........... G02B 27/0179 |

FOREIGN PATENT DOCUMENTS

| | | |
|---|---|---|
| JP | 2015087698 A | 5/2015 |
| JP | 2015090442 A | 5/2015 |
| JP | 2015232608 A | 12/2015 |
| JP | 5866644 B1 | 2/2016 |
| WO | WO-2015098075 A1 | 7/2015 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2017/000942 filed on Jan. 13, 2017 and published in Japanese as WO/2017/145558 A1 on Aug. 31, 2017. This application is based on and claims the benefit of priority from Japanese Patent Applications No. 2016-032259 filed on Feb. 23, 2016 and No. 2016-080579 filed on Apr. 13, 2016. The entire disclosures of all of the above applications are incorporated herein by reference.

TECHNICAL FIELD

The present disclosure relates to a head-up display device that is mounted on a mobile object and configured to display a virtual image.

BACKGROUND ART

Conventionally, a head-up display device (hereinafter abbreviated as HUD device) that is mounted on a mobile object and configured to display a virtual image has been known. The HUD device disclosed in Patent Literature 1 includes a light source unit, a light condensing unit, a liquid crystal element, and an enlarging light guide unit. The light condensing unit collimates an illumination light emitted from a light source unit by condensation. In the liquid crystal element, liquid crystal pixels are arranged in an opening portion, the opening portion is illuminated with the illumination light to form an image, and the display light of the image is emitted in a light flux form in the emission direction corresponding to the incident direction of the illumination light. The enlarging light guide unit guides the display light from the liquid crystal element toward the projection member so that the virtual image is enlarged.

This enlarging light guide unit has a plane mirror as an optical element having no refractive power and a concave mirror as an optical element having positive refractive power, and those optical elements are located on the optical path.

By forming an image with a liquid crystal element by illumination of collimated illumination light as in Patent Literature 1, the directivity of the display light is enhanced. For that reason, it is conceivable that the display light can reliably reach the visible region provided in the mobile object, and a luminance of the virtual image is improved.

However, there is a risk that the configuration of the head-up display device would affect the visibility of the virtual image.

PRIOR TECHNICAL LITERATURE

Patent Literature

Patent Literature 1: JP 2015-90442 A

SUMMARY OF INVENTION

In Patent Literature 1, the virtual image is enlarged by the concave mirror of the enlarging light guide unit. A large virtual image can be produced while an increase in the size of the HUD device is reduced by the action of the concave mirror. At the same time, the present inventors have found that the position of an entrance pupil in the optical system of the HUD device approaches the liquid crystal element.

When the position of the entrance pupil comes closer to the liquid crystal element, a deviation occurs between the emission direction of the display light according to the incident direction of the illumination light and the direction of the display light which actually reaches the visible region and contributes to viewing. Since the deviation differs depending on the liquid crystal pixels arrayed, a luminance difference occurs between the respective liquid crystal pixels, which causes a risk that the visibility of the virtual image is adversely affected.

It is an object of the present disclosure to provide an HUD device configured to produce a high visibility of a virtual image with restricted enlargement in size.

According to one aspect of the present disclosure, a head-up display device is mounted in a mobile object. The head-up display device is configured to project a display light toward a projection member of the mobile object and to cause the display light to reach a visible area in the mobile object while causing the projection member to reflect the display light to display a virtual image visible from an inside of the visible region. The head-up display device comprises a light source unit configured to emit an illumination light. The head-up display device further comprises a light condensing unit configured to cause condensation to collimate the illumination light. The head-up display device further comprises a liquid crystal element including a plurality of liquid crystal pixels aligned in an opening portion and configured to form an image with the illumination light, which is emitted from the light condensing unit to illuminate the opening portion, and to emit the display light of the image in a light flux shape in an emission direction corresponding to an incident direction of the illumination light. The head-up display device further comprises an enlarging light guide unit including a positive optical element having a positive refractive power and a negative optical element having a negative refractive power. The optical elements are located on an optical path to guide the display light from the liquid crystal element toward the projection member while enlarging the virtual image. The negative optical element on the optical path is located closer to the liquid crystal element than the positive optical element.

BRIEF DESCRIPTION OF THE DRAWINGS

The above and other objects, features and advantages of the present disclosure will become more apparent from the following detailed description made with reference to the accompanying drawings. In the drawings.

The above-described object and another object, features, or advantages of the present disclosure will become more obvious through the specific description below with reference to the accompanying figures. In the drawings.

DESCRIPTION OF EMBODIMENTS

Hereinafter, an embodiment of the present disclosure will be described with reference to the drawings.

Figure 1:
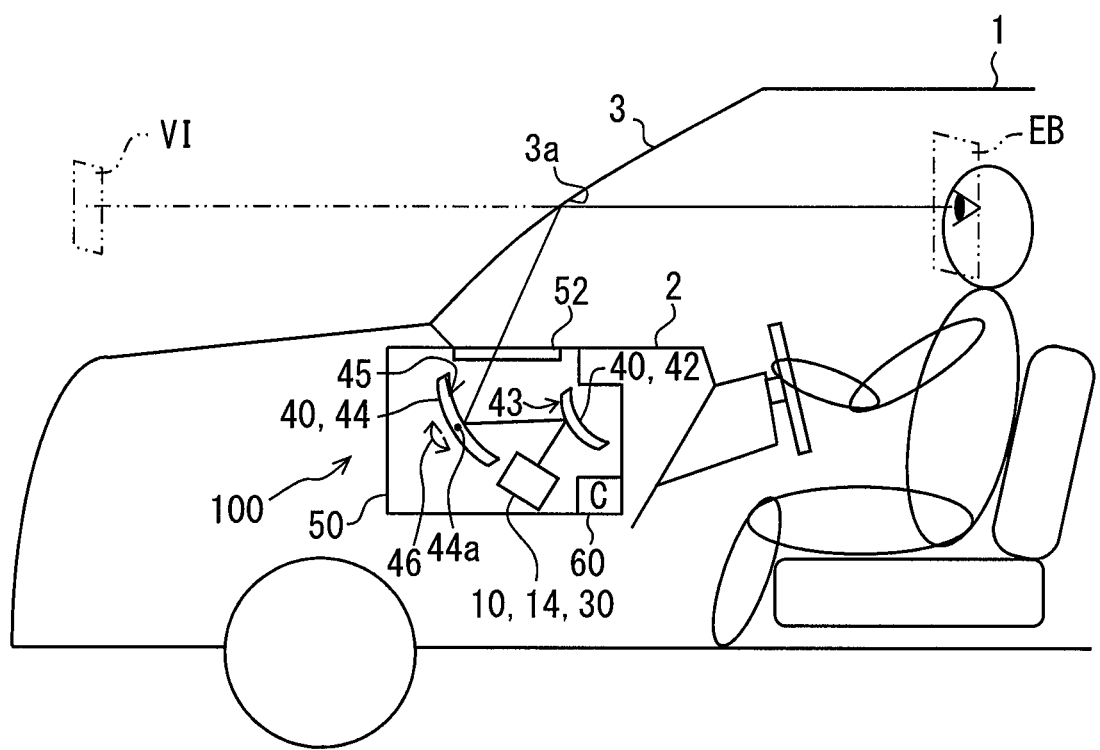
FIG. 1 is a schematic diagram illustrating an installed state of an HUD device in a vehicle according to an embodiment.

As illustrated in FIG. 1, an HUD device 100 according to an embodiment of the present disclosure is mounted in a vehicle 1 that is one type of a moving object, and is housed in an instrument panel 2. The HUD device 100 projects a display light toward a windshield 3 as a projection member of the vehicle 1 and causes a display light to reach a visible region EB provided in the vehicle 1 while reflecting the display light on the windshield 3. As a result, the HUD device 100 displays a virtual image VI visible from an inside of the visible region EB. In other words, the display light is perceived as the virtual image VI by an occupant of the vehicle 1 whose eyes are positioned within the visible region EB in a vehicle interior of the vehicle 1. The occupant is capable of recognizing various pieces of information which are displayed as a virtual image VI. Examples of various pieces of information which is displayed as the virtual image VI include vehicle state values such as vehicle speed and remaining fuel level, or vehicle information such as road information and visibility auxiliary information.

The windshield 3 of the vehicle 1 is formed in a plate shape and made of a light transmissive glass or a synthetic resin and the like. On a surface of the windshield 3 on the vehicle interior side, a reflecting surface 3a on which a display light is reflected is shaped in a smooth concave surface or a plane. The configuration of the windshield 3 is generally set by a vehicle manufacturer based on the use or design of the vehicle 1.

The visible region EB is a space region in which the virtual image VI displayed by the HUD device 100 is visible. In other words, if the occupant's eye is within the visible region EB, the virtual image VI can be visually recognized, and if the occupant's eye is outside the visible region EB, the virtual image VI cannot be visually recognized.

In the present embodiment, the visible region EB is provided so as to overlap with an eyelips set in the vehicle 1. The eyelips is set based on an eye range that statistically represents the distribution of the position of the driver's eyes as an occupant (in detail, refer to JISD0021: 1998). The eyelips is generally set by the vehicle manufacturer according to a position of a seat 4 of the vehicle 1. In other words, the HUD device 100 is adapted to perform a display so that a driver seated in the seat 4 can easily view the display.

A specific configuration of the HUD device 100 described above will be described below. The HUD device 100 includes a light source unit 10, a light condensing unit 14, a liquid crystal element 30, and an enlarging light guide unit 40, which are housed and held in a housing 50.

Figure 2:
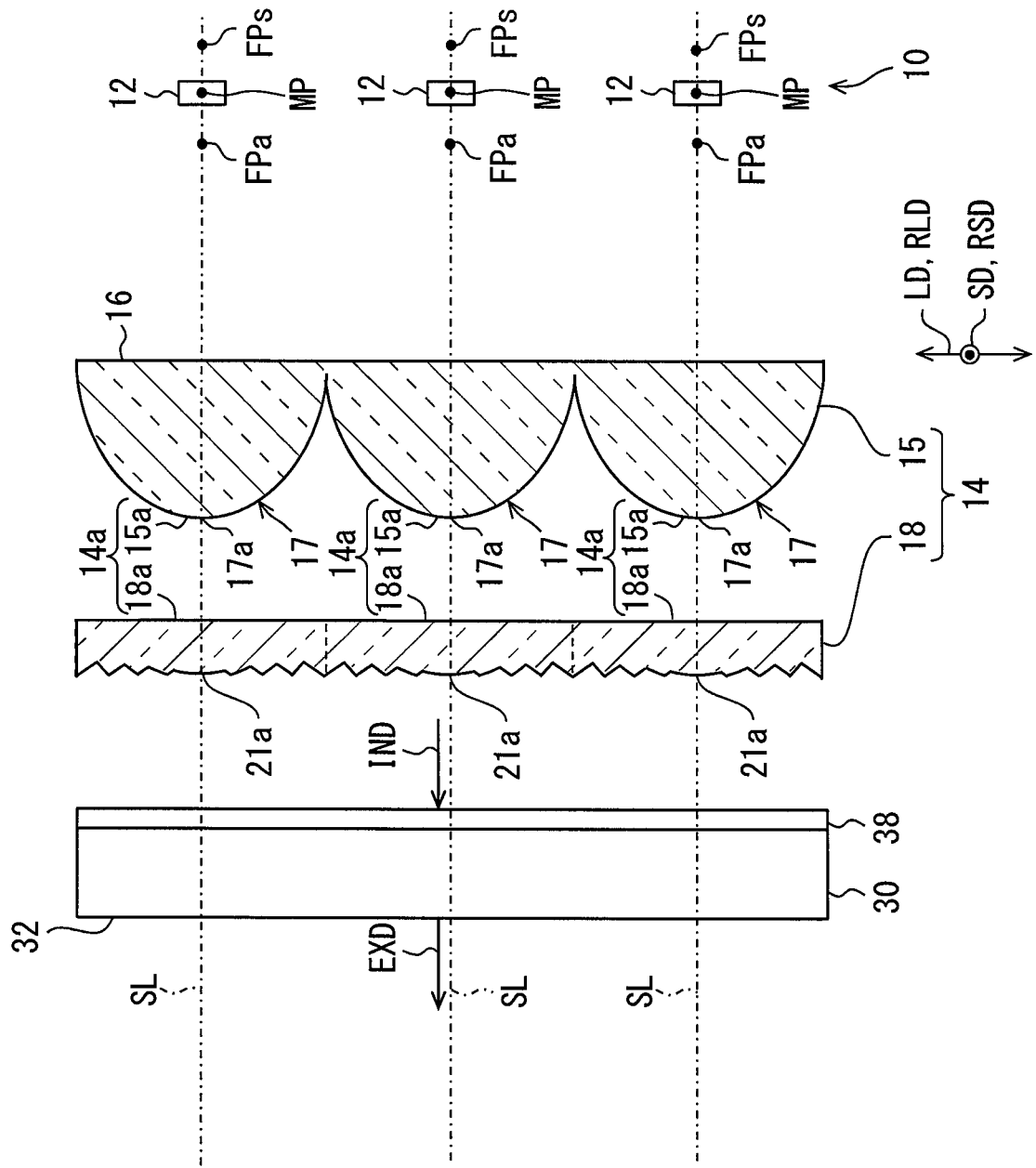
FIG. 2 is a cross-sectional view illustrating a light source unit, a light condensing unit, and a liquid crystal element according to the embodiment, which illustrates a cross section along a longitudinal direction.
Figure 3:
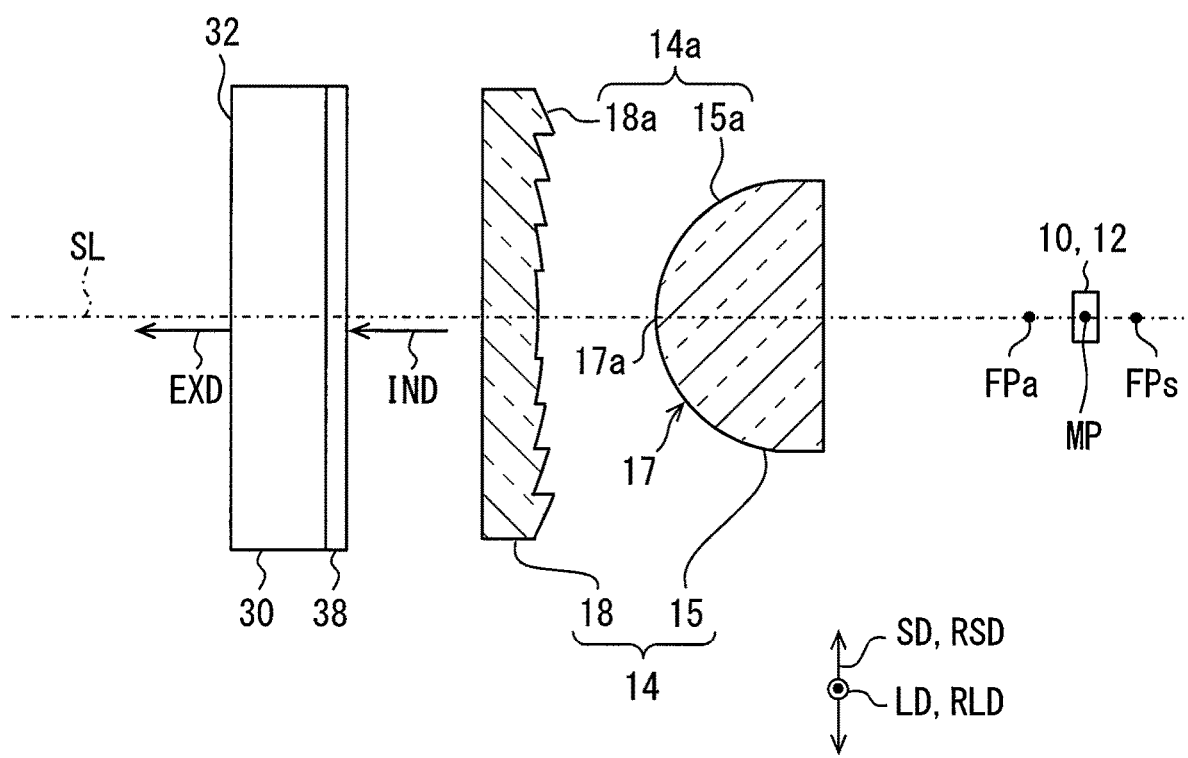
FIG. 3 is a cross-sectional view illustrating a light source unit, a light condensing unit, and a liquid crystal element according to the embodiment, which illustrates a cross section along a short direction.

The light source unit 10 includes multiple light emitting devices 12 aligned with each other as illustrated in FIGS. 2 and 3. Each of the light emitting devices 12 is a light emitting diode device with little heat generation. Each of the light emitting devices 12 is located on a light source circuit board and is electrically connected to a power supply through a wiring pattern on the board. More specifically, each of the light emitting devices 12 is formed by sealing a chip-shaped blue light emitting diode device with a yellow phosphor in which a light transmissive synthetic resin is mixed with a yellow fluorescent agent. The yellow phosphor is excited by the blue light emitted according to the current amount from the blue light emitting diode device to emit the yellow light, and the illumination light of a pseudo white is emitted by combination of the blue light with the yellow light.

Figure 4:
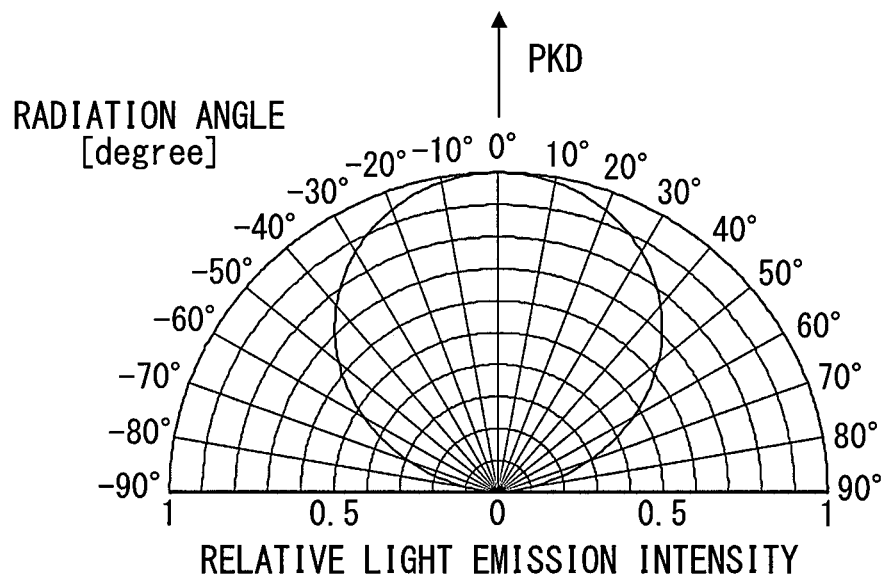
FIG. 4 is a graph illustrating a radiation angle distribution of the light emitting devices according to the embodiment.

In this example, as illustrated in FIG. 4, each of the light emitting devices 12 of the light source unit 10 emits the illumination light with a radiation angle distribution in which the light emission intensity relatively decreases as the light emission intensity deviates from a peak direction PD where the light emission intensity becomes maximum. In the present embodiment, the respective light emitting devices 12 are arranged so that a peak direction PKD is substantially the same between the respective light emitting devices 12.

As illustrated in FIGS. 2 and 3, the light condensing unit 14 has a condenser lens array 15 and a compound lens array 18. The light condensing unit 14 is configured to condense and collimate the illumination light from each of the light emitting devices 12 by both of the lens arrays 15 and 18 so as to be incident on an opening portion 32 of the liquid crystal element 30. In this example, the collimation in the present embodiment represents a state in which the illumination light approaches a collimated light flux more than a state in which the illumination light is radially emitted from each of the light emitting devices 12, and there is no need to put the illumination light into a completely collimated light flux.

The liquid crystal element 30 according to the present embodiment is an active matrix transmission liquid crystal panel using a thin film transistor (TFT).

Figure 5:
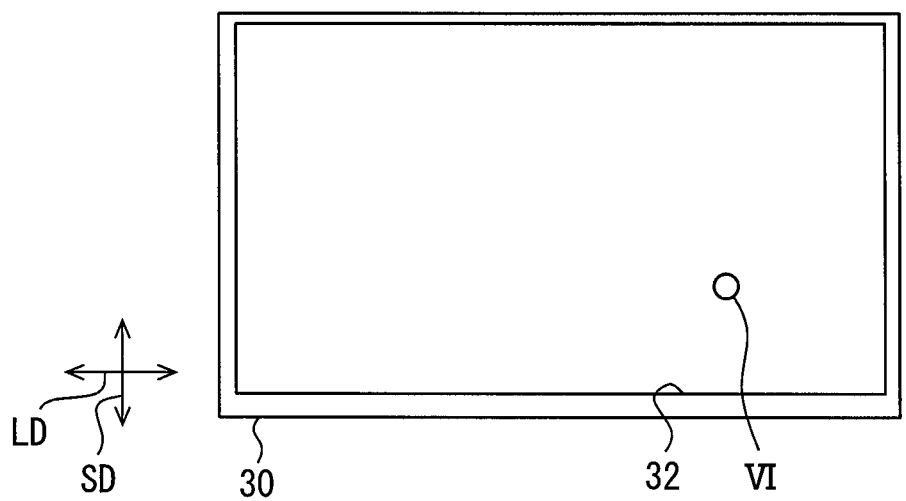
FIG. 5 is a view of a liquid crystal element as viewed along a normal direction of an opening portion according to the embodiment.
Figure 6:
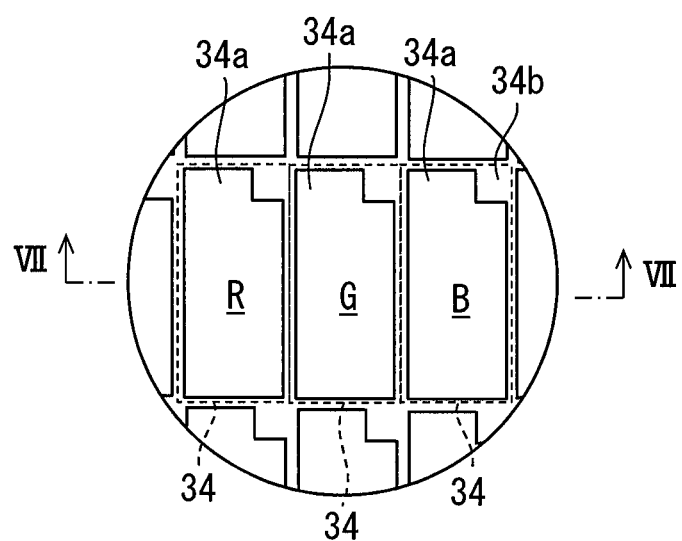
FIG. 6 is an enlarged view illustrating a portion VI in FIG. 5.

Specifically, the liquid crystal element 30 has an opening portion 32 provided so as to transmit the illumination light. As illustrated in FIG. 5, the opening portion 32 is provided in a rectangular shape having a longitudinal direction LD and a short direction SD. In the opening portion 32, as enlargedly illustrated in FIG. 6, the multiple liquid crystal pixels 34 described above are arrayed in a two-dimensional direction along a tangential direction of the opening portion 32.

In each liquid crystal pixel 34, a transmissive portion 34a provided so as to penetrate in a normal direction of the opening portion 32 and a wiring portion 34b formed so as to surround the transmissive portion 34a are provided.

Figure 7:
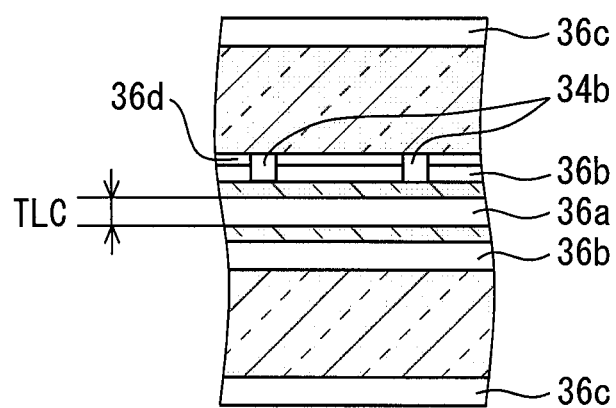
FIG. 7 is a cross-sectional view partially illustrating a cross section along a line VII-VII in FIG. 6.

As illustrated in FIG. 7, in a portion including the transmissive portion 34a in which the liquid crystal pixels 34 of the liquid crystal element 30 are arrayed, a liquid crystal layer 36a, a pair of transparent electrodes 36b sandwiching the liquid crystal layer 36a, a pair of polarizing plates 36c that sandwich those components, and so on are provided in a stacked state.

The liquid crystal layer 36a is a layer filled with a solution containing, as a main component, liquid crystal molecules such as nematic liquid crystal. The transparent electrode 36b is an electrode formed to have a light transmissive property. The polarizing plate 36c has a transmission axis and a light shielding axis substantially orthogonal to each other. The polarizing plate 36c has such a property that when the light in the polarization direction along the transmission axis is incident, the transmittance of the light is maximized. On the other hand, the polarizing plate 36c has such a property that when the light in the polarization direction along the light shielding axis is incident, the transmittance of the light is minimized. In this example, the transmission axes of the pair of polarizing plates 36c are located substantially perpendicular to each other.

A voltage can be applied between the pair of transparent electrodes 36b for each liquid crystal pixel 34 under the control of the electrically connected control unit 60. An orientation direction of the liquid crystal molecules is changed in the liquid crystal layer 36a according to the voltage applied between the pair of transparent electrodes 36b, as a result of which a polarization direction of the light transmitted through the liquid crystal layer 36a changes. In this manner, the transmittance of the light transmitted through the liquid crystal element 30 is variable for each liquid crystal pixel 34, individually. In the case of a predetermined voltage (0 V, for example) corresponding to a maximum transmittance, a thickness TLC of the liquid crystal layer 36a is set to such a thickness that a polarization direction of the light incident from the thickness direction of the liquid crystal layer 36a (that is, the normal direction of the opening portion 32) changes by 90 degrees by the transmission of the liquid crystal layer 36a.

Therefore, the liquid crystal element 30 can form an image while controlling the light transmittance for each liquid crystal pixel 34 by illumination of light to the opening portion 32. Color filters 36d of mutually different colors (for example, red, green, and blue) are provided in adjacent liquid crystal pixels 34, and various colors are produced by a combination of those color filters.

Further, a diffusion unit 38 is provided on the side of the light condensing unit 14 of the liquid crystal element 30. The diffusion unit 38 is a diffusion plate that is provided along a tangential direction of the opening portion 32 and formed in a film shape, for example. Alternatively, the diffusion unit 38 may be formed by providing minute irregularities on a surface of the liquid crystal element 30. Such a diffusion unit 38 exerts some diffusion action just before the collimated illumination light is incident on the opening portion 32.

Now, a description will be returned to the light condensing unit 14. As shown in FIGS. 2 and 3, the condenser lens array 15 is formed by aligning multiple condenser lens elements 15a made of a light transmissive synthetic resin, glass or the like with each other. The condenser lens elements 15a of the same number as that of the light emitting devices 12 are provided, and correspond to the respective light emitting devices 12.

Each of the condenser lens element 15a has a light condensing surface 17 that condenses the illumination light from the corresponding light emitting device 12. Particularly, in the present embodiment, each of the light condensing surfaces 17 is directed toward the liquid crystal element 30 side (that is, the compound lens array 18 side) and provided as an emission side surface for emitting the illumination light. On the other hand, an incident side surface 16 on which the illumination light is incident is a single plane having a smooth planar shape common to the respective condenser lens elements 15a.

In each of the condenser lens elements 15a described above, the light condensing surface 17 is an anamorphic surface formed in a smooth convex shape. The surface vertex 21a of the light condensing surface 17 is located on a virtual straight line SL extending along the peak direction PKD from the corresponding light emitting device 12.

In this example, in a virtual plane orthogonal to the virtual straight line SL, a direction corresponding to the longitudinal direction LD of the opening portion 32 (hereinafter referred to as longitudinal corresponding direction RLD) and a direction corresponding to the short direction SD of the opening portion 32 (hereinafter referred to as short corresponding direction RSD) are provided. The longitudinal corresponding direction RLD corresponds to a direction obtained by projecting the longitudinal direction LD of the opening portion 32 along the optical path of the incident light onto the virtual plane described above. The short corresponding direction RSD corresponds to a direction obtained by projecting the short direction SD of the opening portion 32 along the optical path of the incident light onto the virtual plane described above.

In the present embodiment, as will be described in detail later, there is no factor for bending a traveling direction of the light emitted along the peak direction PKD among the illumination light on the optical path from the light emitting device 12 to the liquid crystal element 30. Further, an incident direction IND of the illumination light is substantially along a normal direction of the opening portion 32. For that reason, the longitudinal direction LD and the longitudinal corresponding direction RLD are substantially in the same direction, and the short direction SD and the short corresponding direction RSD are substantially the same direction.

In the light condensing surface 17 which is an anamorphic surface, the curvature in the longitudinal corresponding direction RLD and the curvature in the short corresponding direction RSD are different from each other. In this example, the magnitude relationship of the curvatures in both of the directions RLD and RSD corresponds to an illumination range IR to be illuminated by one light emitting device 12 in the opening portions 32. For example, in the present embodiment, as a result of the alignment of the light emitting devices 12 along the longitudinal corresponding direction RLD, the illumination range IR is of a rectangular shape in which the longitudinal direction LD of the opening portion 32 is short. Correspondingly, in the light condensing surface 17, the curvature in the longitudinal corresponding direction RLD is set to be larger than the curvature in the short corresponding direction RSD. In short, the curvature in the short direction in the illumination range IR is larger than the curvature in the longitudinal direction in the illumination range IR.

Further, the light condensing surface 17 of each condenser lens element 15a is formed in a parabolic shape in a cross section including the longitudinal corresponding direction RLD and the straight line SL (refer to FIG. 2). On the other hand, the light condensing surface 17 is formed in an arc shape (in particular, in the present embodiment, a semicircular shape) in a cross section including the short corresponding direction RSD and the straight line SL (refer to FIG. 3).

The illumination light incident on the condenser lens array 15 as described above is condensed by the light condensing surface 17 while varying the degree of condensation in both of the directions, passes through each condenser lens element 15*a*, and then enters the compound lens array 18.

Figure 8:
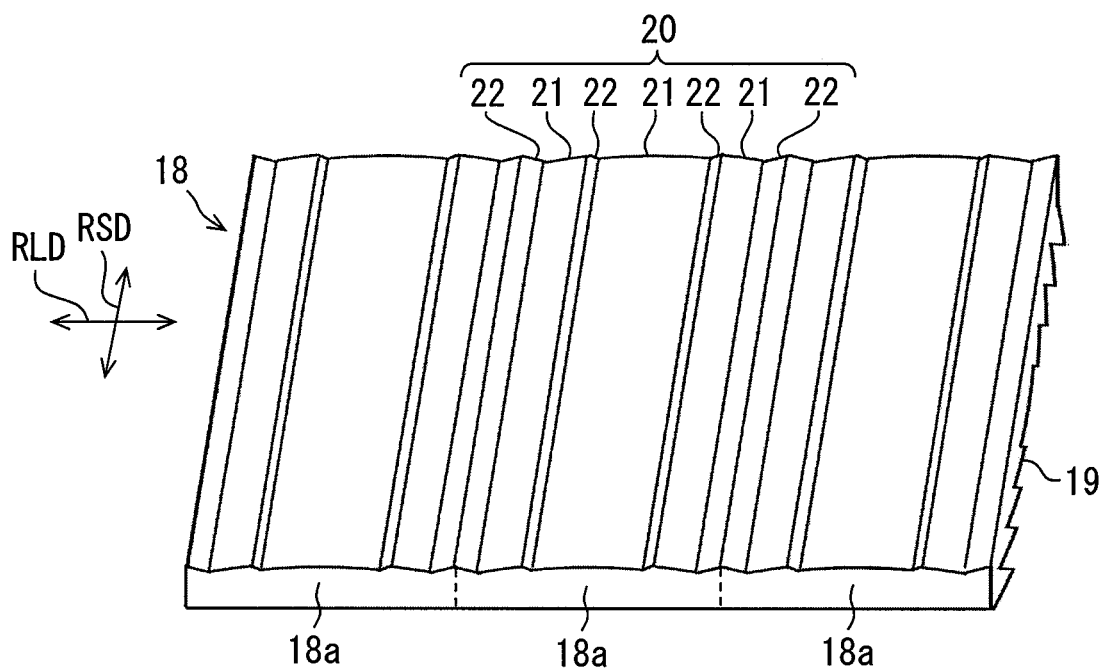
FIG. 8 is a perspective view illustrating a compound lens array according to the embodiment.

The compound lens array 18 is provided on the optical path between the condenser lens array 15 and the liquid crystal element 30, and the multiple compound lens elements 18*a* made of a light transmissive synthetic resin, glass, or the like are aligned with each other and formed. The respective compound lens elements 18*a* of the same number as that of the light emitting devices 12 and the condenser lens elements 15*a* are provided, and correspond to the light emitting devices 12 and the condenser lens elements 15*a*, individually. As illustrated in FIG. 8, each of the compound lens elements 18*a* has a condensing Fresnel surface 19 as an incident side surface that faces the condenser lens array 15 side and receives the illumination light. On the other hand, each of the compound lens elements 18*a* has a compound surface 20 as an emission side surface that faces the liquid crystal element 30 side and emits the illumination light. In FIG. 8, a partial shape of the compound surface 20 is illustrated in a simplified manner.

Figure 9:
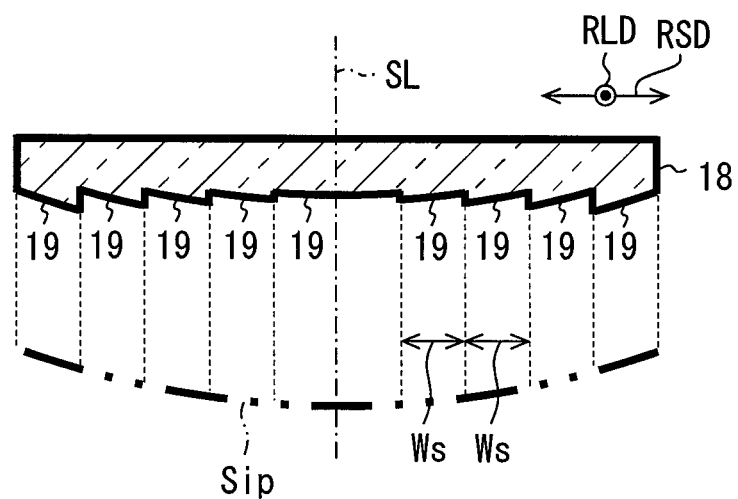
FIG. 9 is a diagram illustrating a condensing Fresnel surface of the compound lens array according to the embodiment.

As illustrated in detail in FIG. 9, the condensing Fresnel surface 19 is formed as partial divided regions obtained by dividing a virtual condensing virtual surface Sip in the short corresponding direction RSD with a predetermined division width Ws. In this example, the condensing virtual surface Sip has a smooth curved surface shape as a convex surface that is convex toward the condenser lens element 15*a* side of the condenser lens array 15. In this example, the division width Ws in the divided region of the condensing Fresnel surface 19 is set to a substantially constant value. The condensing Fresnel surface 19 further condenses the illumination light from the condenser lens array 15 by refraction and causes the condensed illumination light to be transmitted through the compound surface 20 side.

Figure 10:
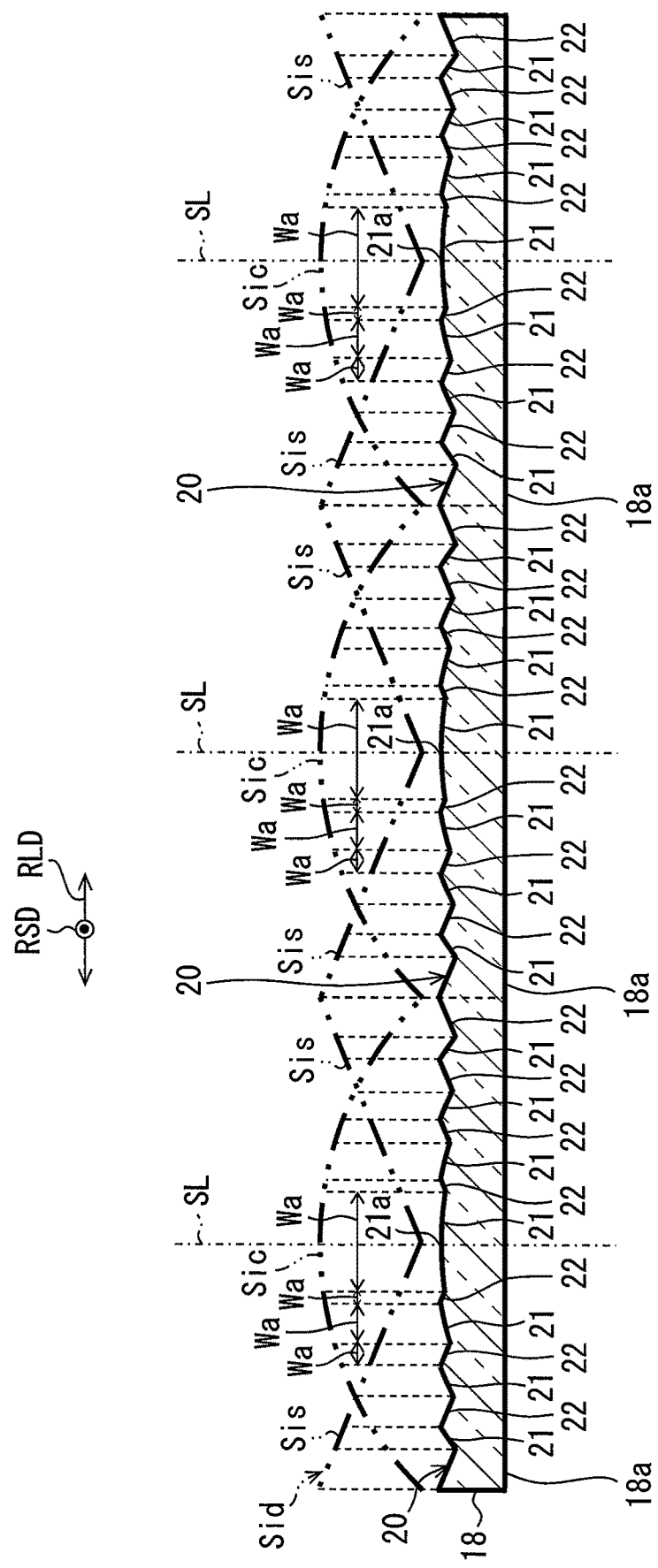
FIG. 10 is a diagram illustrating a compound surface of the compound lens array according to the embodiment.

As illustrated in detail in FIG. 10, the compound surface 20 forms an alternating alignment structure in which the collimating surfaces 21 and the deflecting surfaces 22 are alternately continuous with each other.

The collimating surface 21 is formed as one divided region obtained by dividing a virtual collimating virtual surface Sic by a predetermined division width Wa in a longitudinal corresponding direction RLD. In this example, the collimating virtual surface Sic has a smooth curved surface shape as a convex surface that is convex toward the liquid crystal element 30 side. The curvature of the collimating virtual surface Sic is set to be substantially equal to the curvature of the condensing virtual surface Sip.

The deflecting surface 22 is formed as one divided region obtained by dividing a virtual deflecting virtual surface Sid by a predetermined division width Wa in a longitudinal corresponding direction RLD. The deflecting virtual surface Sid is configured by multiple inclined surfaces Sis which change to a reverse gradient at a position corresponding to the surface vertex of the collimating virtual surface Sic, and in the present embodiment, each inclined surface Sis has a smooth planar shape. In this case, the gradient of each inclined surface Sis is set to be a gradient opposite to the gradient of the corresponding portion of the collimating virtual surface Sic.

In this case, the division width Wa in the divided region of the collimating surface 21 and the deflecting surface 22 is variously set, but is set such that the sag amount is kept approximately constant between the surfaces 21 and 22, to thereby keep a thickness of the entire compound lens array 18 constant. The collimating surfaces 21 and deflecting surfaces 22 are alternately aligned, as a result of which a part of the shape of the collimating virtual surface Sic and a part of the shape of the deflecting virtual surface Sid are extracted, and reproduced on the compound surface 20.

The collimating surface 21 is configured to condense the illumination light from the condensing Fresnel surface 19 by refraction and collimate the condensed illumination light. Further, the deflecting surface 22 is configured to deflect the illumination light to a side opposite to the refraction by the collimating surface 21.

In the collimating surface 21 including the surface vertex of the collimating virtual surface Sic among the respective collimating surfaces 21, the surface vertexes 21*a* are formed on the straight line SL described above (refer to also FIG. 2). The division width Ws described above is set to be largest in the collimating surface 21 including the surface vertexes 21*a*. The division width Ws is changed so that a ratio of an area of the deflecting surface 22 to the collimating surface 21 increases more as a distance from the surface vertex 21*a* in the longitudinal corresponding direction RLD increases more.

Thus, as illustrated in FIGS. 2 and 3, in the light condensing unit 14, the condenser lens elements 15*a* and the compound lens elements 18*a* correspond to each other, individually, and are located to face each other. One corresponding condenser lens element 15*a* and one compound lens element 18*a* will be collectively referred to as a lens element group 14*a*. In other words, the light condensing unit 14 is configured such that the lens element groups 14*a* are arrayed corresponding to the array of the multiple light emitting devices 12.

For each lens element group 14*a*, a combined focal point (hereinafter referred to as a "combined focal point of the lens element group 14*a*") is defined by the light condensing surface 17 of the condenser lens element 15*a*, and the condensing Fresnel surface 19 and the collimating surface 21 of the compound lens element 18*a*. In this example, the lens element group 14*a* includes the light condensing surface 17 which is an anamorphic surface. As a result, the focal position FPa of the combined focal point of the lens element group 14*a* in the cross section including the longitudinal corresponding direction RLD and the straight line SL, and the focal position FPs of the combined focal point of the lens element group 14*a* in the cross section including the short corresponding direction RSD and the straight line SL are deviated in the direction along the straight line SL. More specifically, in the present embodiment, the focal position FPa is located closer to the light condensing unit 14 side than the focal position FPs.

Each of the light emitting devices 12 is located between the focal position FPa and the focal position FPs of the corresponding lens element group 14*a*. In particular, in the present embodiment, the light emitting device 12 is located at an intermediate position between the focal position FPa and the focal position FPs.

The lens element group 14*a* captures a partial radiation flux including the light in the peak direction PKD of the illumination light of the corresponding light emitting device 12. The partial radiation flux of the captured illumination light can be collimated as described above. On the contrary, the other portion of the illumination light which has not been captured is taken into the lens element group 14*a* adjacent to the corresponding lens element group 14*a*.

In the present embodiment, for example, illumination light having a distribution range in which the light emission intensity of the light emitting device 12 is 90% or more than that in the peak direction PKD is captured as a partial radiation flux in the corresponding lens element group 14*a*. In the light emitting device 12 having a radiation angle distribution according to the present embodiment, referring to a placement at which a relative light emission intensity in FIG. 4 is 0.9, the angle is about ±25 degrees. As a result, the lens element group 14*a* captures an angle range of −25° to +25° of the illumination light from the corresponding light emitting device 12 as the partial radiation flux.

As the angle range of the partial radiation flux is larger, the entire opening portion 32 of the liquid crystal element 30 can be illuminated with a smaller total number of light emitting devices 12 whereas the luminance unevenness of the virtual image VI becomes relatively conspicuous. As the angle range of the partial radiation flux is smaller, the luminance unevenness of the virtual image VI becomes less noticeable whereas the total number of light emitting devices 12 necessary for illuminating the opening portion 32 becomes relatively large.

The illumination light is collimated by the condensation of the light condensing unit 14, and emitted from the light condensing unit 14. The illumination light then illuminates the entire opening portion 32 of the liquid crystal element 30 along the incident direction IND. The light transmitted through the opening portion 32 according to the transmittance set for each liquid crystal pixel 34 with respect to the incidence of the illumination light is emitted in the light flux shape corresponding to the shape of the opening portion 32 as the display light of the image from the liquid crystal element 30. In other words, the liquid crystal element 30 emits the image display light in the emission direction EXD corresponding to the incident direction IND. In the present embodiment, the incident direction IND of the illumination light is substantially along the normal direction of the opening portion 32, and basically there is no element for refracting the light in the liquid crystal pixel 34 in the opening portion 32. Therefore, the emission direction EXD of the display light is also substantially along the normal direction of the opening portion 32.

In this example, the display light is emitted from each liquid crystal pixel 34 in a direction other than the emission direction EXD due to the actions of the deflecting surface 22 and the diffusion unit 38. However, the emission direction EXD is still a main direction (that is, the direction having the largest intensity).

In this manner, the display light emitted from the liquid crystal element 30 in the emission direction EXD is incident on the enlarging light guide unit 40.

As illustrated in FIG. 1, the enlarging light guide unit 40 has a convex mirror 42 and a concave mirror 44. The convex mirror 42 and the concave mirror 44 are located on the optical path, and the convex mirror 42 is located closer to the liquid crystal element 30 side on the optical path than the concave mirror 44. Therefore, the display light from the liquid crystal element 30 first enters the convex mirror 42.

The convex mirror 42 is formed by depositing aluminum as a reflecting surface 43 on a surface of a base material made of synthetic resin or glass. The reflecting surface 43 has a convexly curved convex surface so as to be formed in a smooth curved surface shape, thereby having a negative surface refractive power. In particular, the reflecting surface 43 according to the present embodiment is a free curved surface mainly for correcting axial aberration in the virtual image VI. The convex mirror 42 reflects the display light from the liquid crystal element 30 toward the concave mirror 44 by the reflecting surface 43. In this way, the convex mirror 42 functions as a negative optical element having a negative refractive power. In this example, the refractive power is represented by the reciprocal of a focal length.

The concave mirror 44 is formed by depositing aluminum as a reflecting surface 45 on a surface of a base material made of synthetic resin or glass. The reflecting surface 45 has a concavely curved concave surface so as to be formed in a smooth curved surface shape, thereby having a positive surface refractive power. In particular, the reflecting surface 45 according to the present embodiment is a free curved surface mainly for correcting distortion aberration in the virtual image VI. The concave mirror 44 reflects the display light from the convex mirror 42 toward the windshield 3 by the reflecting surface 45. In this way, the concave mirror 44 functions as a positive optical element having a positive refractive power.

A drive mechanism 46 for swingingly driving the concave mirror 44 located on the side of the windshield 3 of the enlarging light guide unit 40 is provided in the enlarging light guide unit 40. The drive mechanism 46 swingingly drives the concave mirror 44 around the rotation axis 44*a*, for example, by the drive of a stepping motor according to a drive signal from the control unit 60 electrically connected to the drive mechanism 46. As the concave mirror 44 swings, the image forming position of the virtual image VI moves up and down so as to be adjusted to a position easily visible from the occupant.

The enlarging light guide unit 40 guides the display light from the liquid crystal element 30 toward the windshield 3 so that the virtual image VI is enlarged. In other words, the synthetic refractive power of the convex mirror 42 and the concave mirror 44 is the positive refractive power.

A window portion is provided in the housing 50 between the concave mirror 44 and the windshield 3. The window portion is covered with a dustproof cover 52 formed in a light transmissive thin plate shape. Therefore, the display light from the concave mirror 44 passes through the dustproof cover 52 and is reflected on the windshield 3. In this way, the display light reflected on the windshield 3 reaches the visible region EB.

Figure 11:
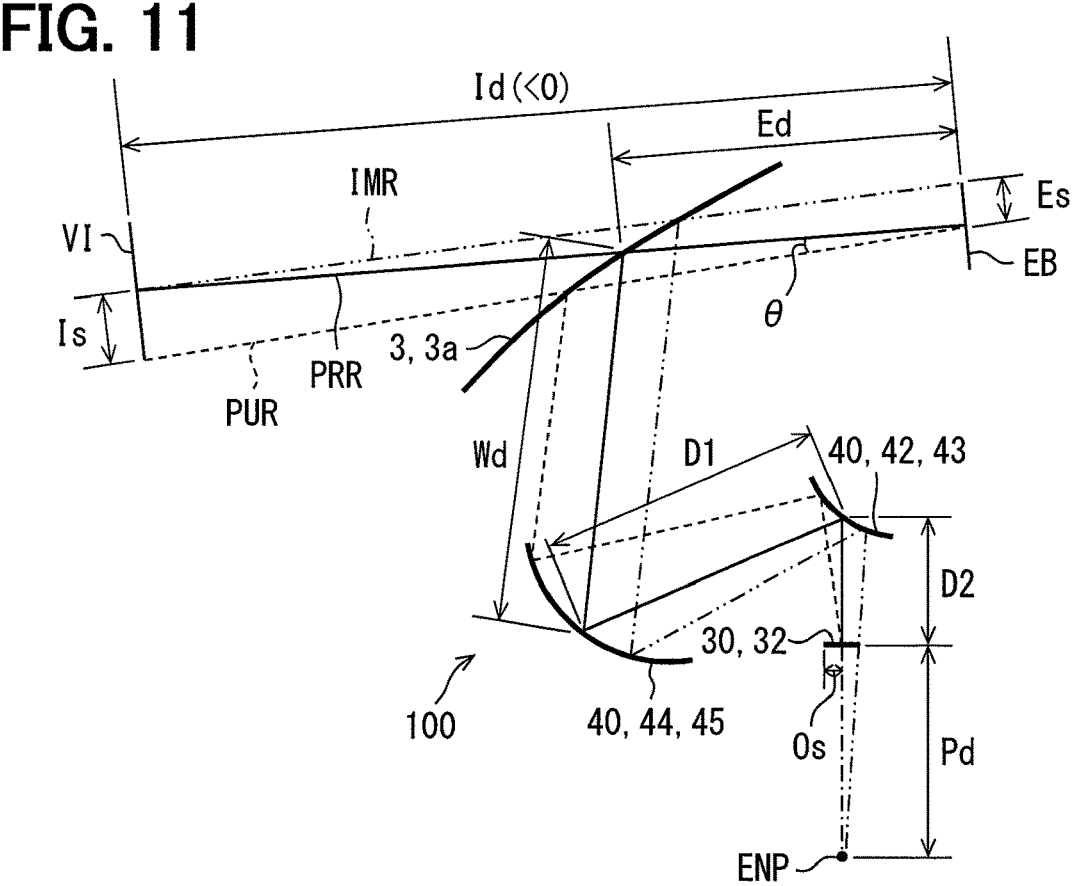
FIG. 11 is a diagram schematically illustrating an optical system by the HUD device according to the embodiment.

The optical system configured by the HUD device 100 described above will be discussed in detail below with reference to FIGS. 11 and 12. The shapes, positional relationships, direction of light rays, and the like of the respective element shown in FIGS. 11 and 12 are schematically illustrated for description.

Hereinafter, in the optical path of the optical system shown in FIG. 11, it is assumed that an interval from the virtual image VI to the visible region EB is Id (where Id<0 for the virtual image), an interval from the visible region EB to the windshield 3 is Ed, an interval from the windshield 3 to the reflecting surface 45 of the concave mirror 44 is Wd, an interval from the reflecting surface 45 of the concave mirror 44 to the reflecting surface 43 of the convex mirror 42 is D1, and an interval from the reflecting surface 43 of the convex mirror 42 to the opening portion 32 of the liquid crystal element 30 is D2. Further, it is assumed that a surface refractive power of the reflecting surface 3*a* of the windshield 3 is φws, a surface refractive power of the reflecting surface 45 of the concave mirror 44 is φ1 (where φ1>0), and a surface refractive power of the reflecting surface 43 of the convex mirror 42 is φ2 (where φ2<0). In addition, it is assumed that a half value of the size of the virtual image VI is Is, a half value of the size of the visible region EB is Es, and a half value of the size of the opening portion 32 of the liquid crystal element 30 is Os.

Figure 12:
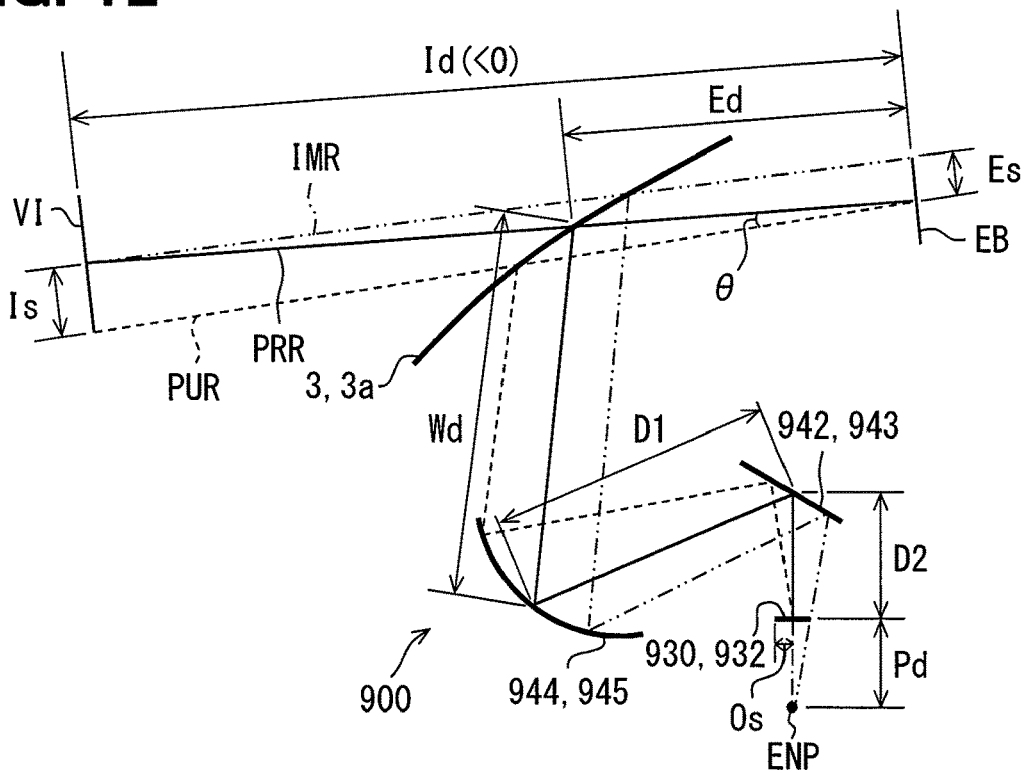
FIG. 12 is a diagram corresponding to FIG. 11 in a comparative example.

In this example, first, an HUD device 900 of a comparative example in which the convex mirror 42 of the present embodiment is replaced by a plane mirror 942 having a planar reflecting surface 943 as shown in FIG. 12 will be considered. In the comparative example, D1 is read as an interval from the reflecting surface 945 of a concave mirror 944 to a reflecting surface 943 of a plane mirror 942, D2 is read as an interval from a reflecting surface 943 of a plane mirror 942 to an opening portion 932 of a liquid crystal element 930, and a surface refractive power of a reflecting surface 943 of a plane mirror 942 is 0.

In the comparative example described above, an angle of an image forming ray IMR and a height of an image forming ray IMR are sequentially obtained by backward ray tracing from the visible region EB to the liquid crystal element 930 side. In this example, the angle of the image forming ray IMR is an angle formed by a light ray (hereinafter referred to as image forming ray IMR) along a direction connecting the end portion of the visible region EB with the center of the virtual image VI between the visible region EB and the windshield 3 to a light ray passing through the center of the visible region EB and the center of the opening portion 932 (hereinafter referred to as a principal ray PRR). The height of the image forming ray IMR is a height between the principal ray PRR and the image forming ray IMR along a direction perpendicular to the principal ray PRR.

Between the visible region EB and windshield 3, the angle of the image forming ray IMR is $-Es/Id$. In the windshield 3, the height of the image forming ray IMR is $Es+(Es/Id)\cdot Ed$. Between the windshield 3 and the concave mirror 944, the angle of the image forming ray IMR is $-Es/Is+\phi ws\cdot(Es+(Es/Id)\cdot Wd)$, which is defined as an HUD constant A. The height of the image forming ray IMR in the concave mirror 944 is $Es+(Es/Id)\cdot Ed+(Es/Id)\cdot Wd-\phi ws\cdot Ws\cdot(Es+Es/Id\cdot Wd)$, which is defined as an HUD constant B. Between the concave mirror 944 and the plane mirror 942, the angle of the image forming ray IMR is $A+B\cdot\phi 1$. In the plane mirror 942, the height of the image forming ray IMR is $B-D1\cdot(A+B\cdot\phi 1)$. Between the plane mirror 942 and the liquid crystal element 930, the angle of the image forming ray IMR is $A+B\cdot\phi 1$. The height of the image forming ray IMR in the liquid crystal element 930 is 0. Therefore, an image formed state at the opening portion 932 of the liquid crystal element 930 is produced.

In the comparative example, an angle of a pupil image forming ray PUR and a height of the pupil image forming ray PUR are sequentially obtained by back ray tracing from the visible region EB to the liquid crystal element 930 side. In this example, the angle of the pupil image forming ray PUR is an angle formed by a light ray (hereinafter referred to as pupil image forming ray PUR) along a direction in which a center of the visible region EB is connected with an end portion of the virtual image VI between the visible region EB and the windshield 3 to the principal ray PRR. The height of the pupil image forming ray PUR is an interval between the principal ray PRR and the pupil image forming ray PUR along a direction perpendicular to the principal ray PRR.

Between the visible region EB and the windshield 3, the angle of the pupil image forming ray PUR corresponds to a half angle of view $\theta$ of the virtual image VI, and is $\theta=-Is/Id$. In the windshield 3, the height of the pupil image forming ray PUR is $-\theta\cdot Ed$. Between the windshield 3 and the concave mirror 944, the angle of the pupil image forming ray PUR is $\theta-\theta\cdot Ed\cdot\phi ws$, which is set as an HUD constant C. In the concave mirror 944, the height of the pupil image forming ray PUR is $-\theta\cdot Ed+(\theta-\theta\cdot Ed\cdot\phi ws)\cdot Wd$, which is set as an HUD constant D. Between the concave mirror 944 and the plane mirror 942, the angle of the pupil image forming ray PUR is $C+D\cdot\phi 1$. In the plane mirror 942, the height of the pupil image forming ray PUR is $D-(C+D\cdot\phi 1)\cdot D1$. Between the plane mirror 942 and the liquid crystal element 930, the angle of the pupil image forming ray PUR is $C+D\cdot\phi 1$. The height of the pupil image forming ray PUR in the liquid crystal element 930 is Os.

As described above, in the comparative example, the half angle of view $\theta$ is expressed as follows.

$$\theta=(Os/Es)\cdot(A+B\cdot\phi 1) \quad \text{(Expression 1)}$$

Since a pupil distance Pd from the opening portion 932 of the liquid crystal element 930 to the entrance pupil ENP may be obtained by determining a distance at which the height of the pupil image forming ray PUR becomes 0, the following expression is obtained.

$$Pd=Os/(C+D\cdot\phi 1) \quad \text{(Expression 2)}$$

Further, an optical path length Lm from the opening portion 932 of the liquid crystal element 930 to the concave mirror 944 is $$Lm=D1+D2=(Os/Es)\cdot(B/\theta) \quad \text{(Expression 3)}$$

In other words, based on Expression 1, the half angle of view $\theta$ of the virtual image VI increases more as the surface refractive power $\phi 1$ of the concave mirror 944 increases more. In other words, in order to enlarge the virtual image VI, there is a need to increase the surface refractive power $\phi 1$. On the other hand, however, based on Expression 2, the pupil distance Pd decreases more as the surface refractive power $\phi 1$ increases more. In other words, the enlargement of the virtual image VI and the long pupil distance Pd cannot be produced at the same time. Incidentally, based on Expression 3, the optical path length Lm decreases more as the surface refractive power $\phi 1$ increases more.

Next, the HUD device 100 according to the present embodiment shown in FIG. 11 will be considered in the same manner as in the comparative example.

An angle of an image forming ray IMR and a height of an image forming ray IMR are sequentially obtained by backward ray tracing from the visible region EB to the liquid crystal element 30 side.

Between the visible region EB and windshield 3, the angle of the image forming ray IMR is $-Es/Id$. In the windshield 3, the height of the image forming ray IMR is $Es+(Es/Id)\cdot Ed$. Between the windshield 3 and the concave mirror 44, the angle of the image forming ray IMR is $-Es/Is+\phi ws\cdot(Es+(Es/Id)\cdot Wd)$, which is defined as an HUD constant A as in the comparative example. The height of the image forming ray IMR in the concave mirror 44 is $Es+(Es/Id)\cdot Ed+(Es/Id)\cdot Wd-\phi ws\cdot Ws\cdot(Es+Es/Id\cdot Wd)$, which is defined as an HUD constant B as in the comparative example. Between the concave mirror 44 and the convex mirror 42, the angle of the image forming ray IMR is $A+B\cdot\phi 1$. In the convex mirror 42, the height of the image forming ray IMR is $B-D1\cdot(A+B\cdot\phi 1)$. Between the convex mirror 42 and the liquid crystal element 30, the angle of the image forming ray IMR is $A+B\cdot\phi 1+\phi 2\cdot(B-D1\cdot(A+B)\cdot\phi 1)$. The height of the image forming ray IMR in the liquid crystal element 30 is 0. Therefore, an image formed state at the opening portion 32 of the liquid crystal element 30 is produced.

An angle of a pupil image forming ray PUR and a height of the pupil image forming ray PUR are sequentially obtained by back ray tracing from the visible region EB to the liquid crystal element 30 side.

Between the visible region EB and the windshield 3, the angle of the pupil image forming ray PUR corresponds to a half angle of view $\theta$ of the virtual image VI, and is $\theta=-Is/Id$.

In the windshield 3, the height of the pupil image forming ray PUR is $-\theta \cdot Ed$. Between the windshield 3 and the concave mirror 44, the angle of the pupil image forming ray PUR is $\theta - \theta \cdot Ed \cdot \phi ws$, which is set as an HUD constant C as in the comparative example. In the concave mirror 44, the height of the pupil image forming ray PUR is $-\theta \cdot Ed + (\theta - \theta \cdot Ed \cdot \phi ws) \cdot Wd$, which is set as an HUD constant D as in the comparative example. Between the concave mirror 44 and the convex mirror 42, the angle of the pupil image forming ray PUR is $C + D \cdot \phi 1$. In the convex mirror 42, the height of the pupil image forming ray PUR is $D - (C + D \cdot \phi 1) \cdot D1$. Between the convex mirror 42 and the liquid crystal element 30, the angle of the pupil image forming ray PUR is $C + D \cdot \phi 1 + \phi 2 \cdot (D - D1 \cdot (C + D \cdot \phi 1))$. The height of the pupil image forming ray PUR in the liquid crystal element 30 is Os.

As described above, in the comparative example, the half angle of view $\theta$ is expressed as follows.

$$\theta = (Os/Es) \cdot (A + B \cdot \phi 1 + \phi 2 \cdot (B - D1 \cdot (A + B \cdot \phi 1))) \quad \text{(Expression 4)}$$

Since a pupil distance Pd from the opening portion 32 of the liquid crystal element 30 to the entrance pupil ENP may be obtained by determining a distance at which the height of the pupil image forming ray PUR becomes 0, the following expression is obtained.

$$Pd = Os/((C + D \cdot \phi 1) \cdot (1 - \phi 2 \cdot D1) + \phi 2 \cdot D) \quad \text{(Expression 5)}$$

Further, an optical path length Lm from the opening portion 32 of the liquid crystal element 30 to the concave mirror 44 is expressed as follows.

$$Lm = D1 + D2 = D1 + (B - D1 \cdot (A + B \cdot \phi 1))/(A + B \cdot \phi 1 + \phi 2 \cdot (B - D1 \cdot (A + B \cdot \phi 1))) \quad \text{(Expression 6)}$$

In other words, Expressions 4, 5, and 6 are simultaneous equations with three variables of surface refractive powers $\phi 1$, $\phi 2$ and interval D1. As a result, the half angle of view $\theta$ and the pupil distance Pd are not a simple relationship depending on the surface refractive power $\phi 1$ as in the comparative example. The surface refractive powers $\phi 1$, $\phi 2$ and the interval D1 are appropriately set, thereby being capable of increasing the pupil distance Pd while increasing the half angle of view $\theta$. Specifically, since $\phi 2$ is negative, the angle of the pupil image forming ray PUR between the convex mirror 42 and the liquid crystal element 30 acts to be small. In other words, since the denominator of Expression 5 becomes smaller, the pupil distance Pd can be increased.

With an increase in the pupil distance Pd, the emission direction EXD of the display light emitted from the liquid crystal element 30 can match the direction of the pupil image forming ray PUR between the convex mirror 42 and the liquid crystal element 30 described above are spread over the entire image. For example, it is preferable that the pupil distance Pd is larger than the interval D1 or D2. In the present embodiment, Pd>150 mm is set in both of the longitudinal direction LD and the short direction SD of the opening portion 32. With the above configuration, a deviation between the emission direction EXD and the direction of the pupil image forming ray PUR can be sufficiently reduced.

(Operational Effects)

The operational effects according to the present embodiment described above will be described below.

According to the present embodiment, the enlarging light guide unit 40 guides the display light from the liquid crystal element 30 toward the windshield 3. The enlarging light guide unit 40 has the concave mirror 44 that functions as the positive optical element having the positive refractive power and the convex mirror 42 that functions as the negative optical element having the negative refractive power. The convex mirror 42 is located closer to the liquid crystal element 30 side on the optical path than the concave mirror 44. The optical system of the HUD device 100, in which the optical elements 42 and 44 are located on the optical path, enables to locate the entrance pupil ENP farther away from the liquid crystal element 30 toward the light source unit 10 side with the use of the convex mirror 42, while enlarging the virtual image VI with the use of the concave mirror 44. As the entrance pupil ENP is located away, such an optical path as to look into the opening portion 32 of the liquid crystal element 30 along the emission direction EXD of the display light from the inside of the visible region EB can be configured. Therefore, the deviation between the direction of the display light contributing to visual recognition and the emission direction EXD from the liquid crystal element 30 can be reduced. Since the emission direction EXD corresponds to the incident direction IND of the collimated illumination light to the liquid crystal element 30, the illumination light can efficiently reach the visible region EB as the display light of the image while the luminance difference between the liquid crystal pixels 34 can be reduced.

Furthermore, on the optical path between the convex mirror 42 and the liquid crystal element 30, the direction of the display light contributing to visual recognition approaches the emission direction EXD corresponding to the incident direction IND of the illumination light collimated by the light condensing unit 14, thereby being capable of guiding the display light while reducing the size expansion of the convex mirror 42. As described above, the HUD device 100 that is excellent in visibility of the virtual image VI while an increase in the physical size is reduced can be provided even in the case where the image is enlarged.

Further, according to the present embodiment, the positive optical element is the concave mirror 44 having the concave curved reflecting surface 45, and the negative optical element is the convex mirror 42 having the convex curved reflecting surface 43. Since the function of the enlarging light guide unit 40 is produced by the reflection by those reflecting surfaces 43 and 45, while the occurrence of chromatic aberration in the enlarging light guide unit 40 is suppressed, the virtual image VI is enlarged and the entrance pupil ENP can be kept away from the light source unit 10 side more than the liquid crystal element 30.

According to the present embodiment, the compound surface 20 is provided in the compound lens array 18 as the compound lens of the light condensing unit 14. The compound surface 20 forms an alternating alignment structure in which the collimating surface 21 that collimates the illumination light by refraction and the deflecting surface 22 that deflects the illumination light to the side opposite to the refraction of the collimating surface 21 are alternately continuous with each other. In the alignment structure, the directivity of the display light can be adjusted by mixing the illumination light passing through the collimating surface 21 from the light source unit 10 with the illumination light passing through the deflecting surface 22. Therefore, the luminance difference between the liquid crystal pixels 34 can be reduced in combination with the configuration of the enlarging light guide unit 40 described above.

In addition, according to the present embodiment, the light condensing surface 17 provided in the condenser lens array 15 as a condenser lens is an anamorphic surface in which the curvature in the longitudinal corresponding direction RLD and the curvature in the short corresponding direction RSD are different from each other. With the above configuration, since the illumination light from the light source unit 10 can be made uniform according to the rectangular opening portion 32, the luminance difference between the liquid crystal pixels 34 can be reduced.

Other Embodiments

Hitherto, an embodiment of the present disclosure has been described. However, this disclosure is not construed as limited to the embodiment, and can be applied to various embodiments within the scope not departing from the gist of this disclosure.

Figure 13:
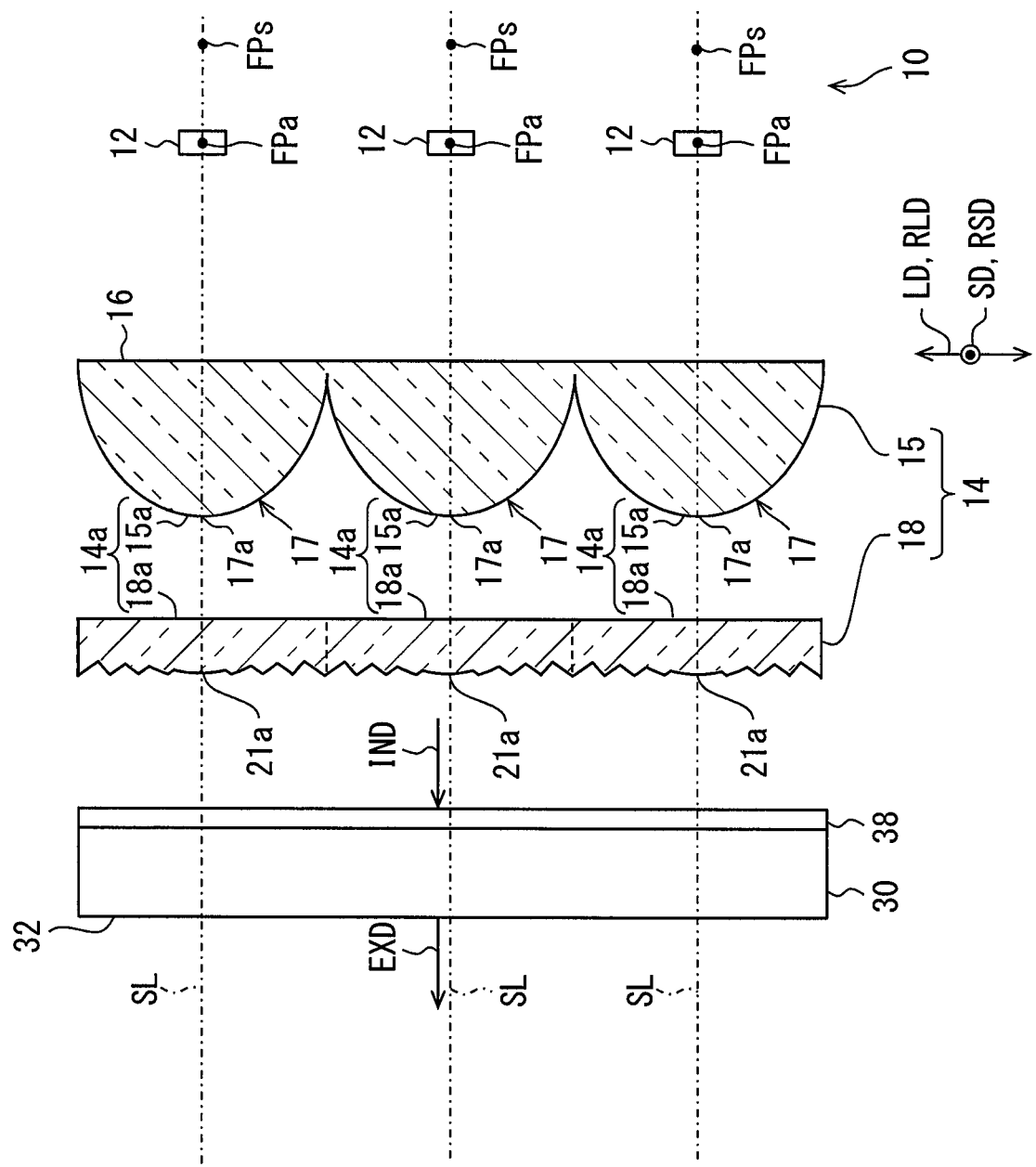
FIG. 13 is a diagram corresponding to FIG. 2 in Modification 1.

Specifically, as Modification 1, as shown in FIG. 13, the light emitting device 12 of the light source unit 10 may be located at a position overlapping with the focal position FPa located on the side of the light condensing unit 14 of the focal position FPa and the focal position FPs. With the placement of the light emitting devices 12 described above, a proportion of the light that is inclined and advances from an outer peripheral side of the opening portion 32 to an inner peripheral side as the light advances toward the enlarging light guide unit 40 side to the illumination light passing through the opening portion 32 is reduced. Therefore, the luminance in the direction of the display light contributing to the visibility is enhanced in addition to the action of the entrance pupil ENP moving toward the light source unit 10 side, thereby making the visibility of the virtual image VI higher.

As Modification 2, the light condensing unit 14 may not have a compound lens provided with the compound surface 20 as with the compound lens array 18 in the embodiment described above. For example, the compound lens array 18 may be replaced with a general convex lens or convex lens array.

As Modification 3, the light condensing unit 14 may not have the condenser lens provided with the light condensing surface 17 that is an anamorphic surface as with the condenser lens array 15 in the embodiment described above. For example, the light condensing surface 17 may be a spherical surface or a rotationally symmetric aspherical surface, and a general convex lens or convex lens array may be employed instead of the condenser lens array 15.

In Modification 4, the light condensing unit 14 may be configured by one or three or more optical elements.

In Modification 5, the light emitting devices 12 may be arrayed in a two-dimensional direction.

In Modification 6, a reflective liquid crystal element may be employed as the liquid crystal element 30.

In Modification 7, a convex lens may be employed as the positive optical element.

In Modification 8, a concave lens may be employed as the negative optical element.

Figure 14:
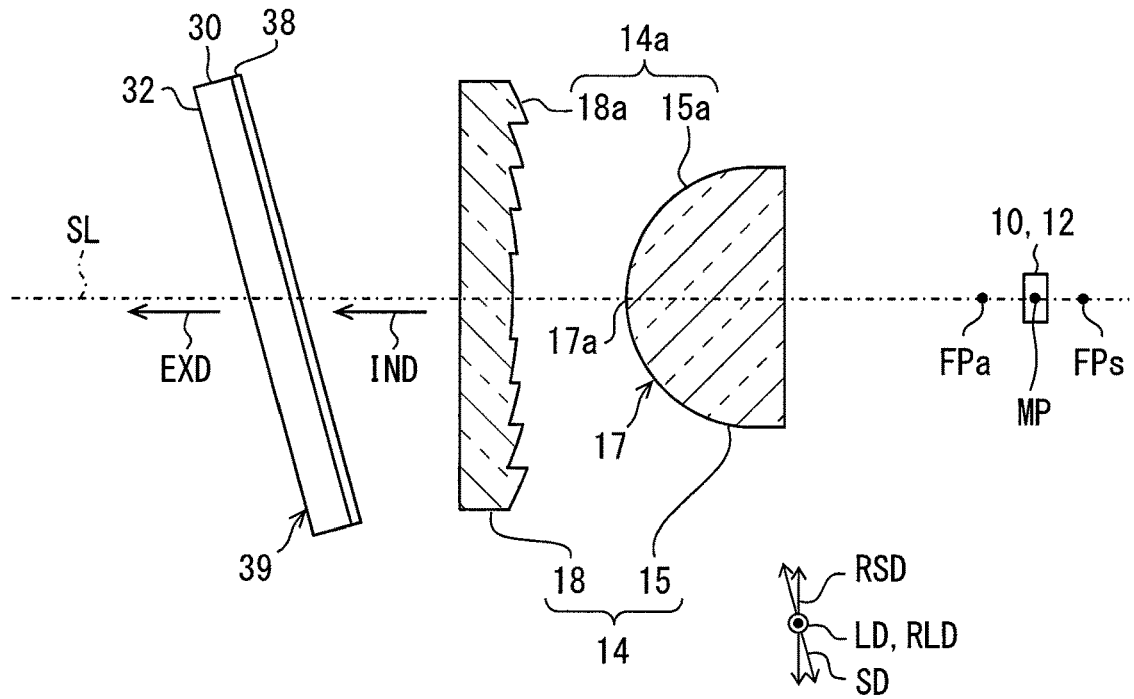
FIG. 14 is a diagram corresponding to FIG. 3 in Modification 9.

In Modification 9, as shown in FIG. 14, the transmissive liquid crystal element 30 is located such that the normal direction of the opening portion 32 is inclined with respect to the incident direction IND of the illumination light and the straight line SL. Specifically, it is preferable that the normal direction of the opening portion 32 forms an angle of about 10 to 25 degrees with respect to the incident direction IND and the straight line SL. Since the liquid crystal pixel 34 in the opening portion 32 basically has no element for deflecting the light, the emission direction EXD of the display light substantially matches the incident direction IND. Therefore, the normal direction of the opening portion 32 is also arranged in a state of being inclined with respect to the emission direction EXD.

In more detail, the liquid crystal element 30 in FIG. 14 is inclined with the longitudinal direction LD as the rotation axis. Therefore, the liquid crystal element 30 is located so as to be inclined with respect to the short corresponding direction RSD. As a result of the above placement, an interval between the compound lens array 18 and the liquid crystal element 30 varies depending on the position in the cross section along the short direction SD and the short corresponding direction RSD.

In the liquid crystal elements 30 described above, as illustrated in FIG. 15, a planar reflecting surface 39 is formed on the side facing the convex mirror 42, for example, by a mirror surface configured as a surface of a glass substrate. For example, when an external light such as sunlight passes through the windshield 3 and is reflected on the concave mirror 44 and the convex mirror 42 to reach the liquid crystal elements 30, the possibility that the external light enters the liquid crystal elements 30 in an exact direction opposite to the emission direction EXD is high. In this example, since the normal direction of the opening portion 32 is inclined with respect to the emission direction EXD, the reflecting surface 39 reflects the external light in a direction different from the emission direction EXD. Therefore, the external light reflected on the reflecting surface 39 can be prevented from reaching the visible region EP together with the display light.

Figure 15:
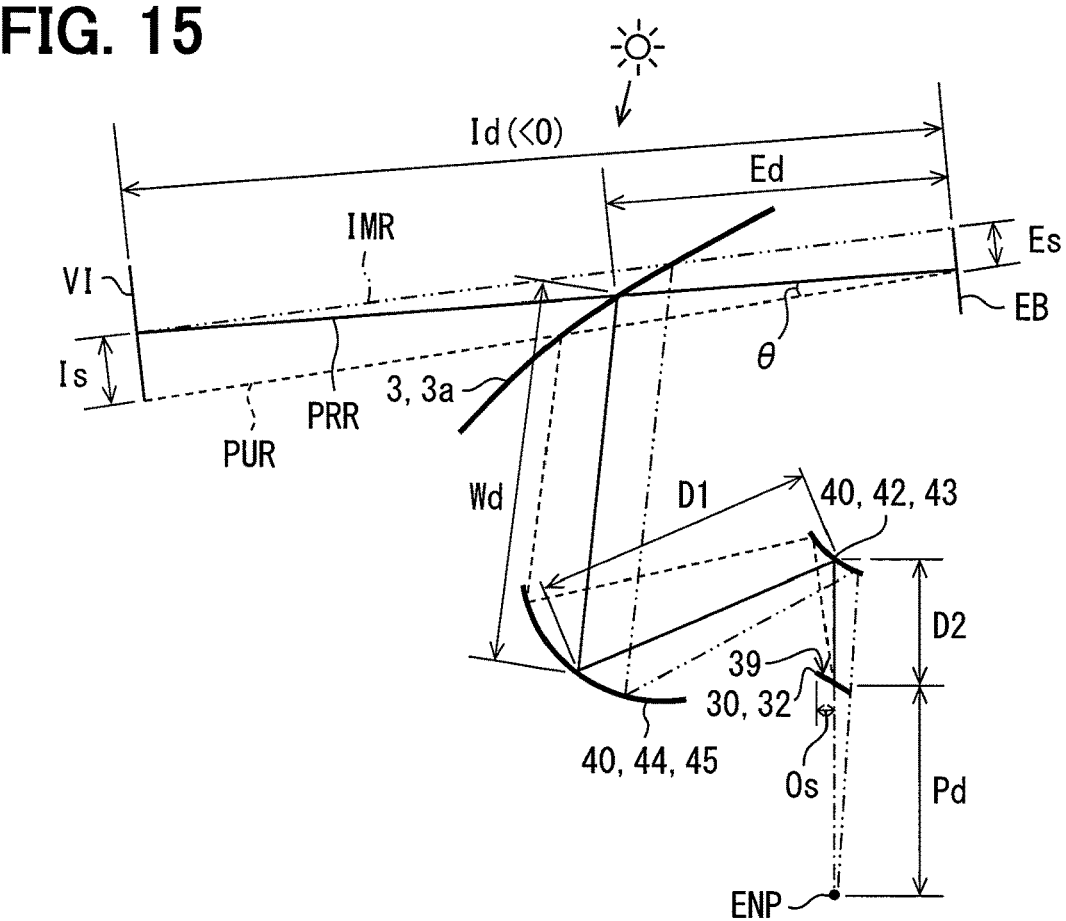
FIG. 15 is a diagram corresponding to FIG. 11 in Modification 9.

In addition, as illustrated in FIG. 15, it is preferable that the inclination direction or angle of the liquid crystal elements 30 is set so as to satisfy a Scheimpflug condition or to come close to the condition in consideration of the alignment angle of the convex mirror 42, the concave mirror 44, and the windshield 3. According to the inclination direction and angle described above, the inclination of the virtual image VI with respect to the principal ray PRR can be reduced.

In Modification 10, in the compound lens array 18, the division width Wa in the region division of the collimating surface 21 and the deflecting surface 22 may be set to be substantially the same width at each position.

In Modification 11, the compound surface 20 of the compound lens array 18 may have a configuration in which the shape of the collimating surface 21 is replaced with an inclined planar shape.

In Modification 12, the present disclosure may be applied to various mobile objects (transportation equipment) such as vessels or aircraft other than the vehicle 1.

The head-up display device described above is mounted on the mobile object 1, projects the display light toward the projection member 3 of the mobile object, and allows the display light to reach the visible region EB provided in the mobile object while reflecting the display light on the projecting member. As a result, the virtual image VI visible from the inside of the visible region is displayed. The light source unit 10 emits the illumination light. The light condensing unit 14 collimates the illumination light by condensation. In the liquid crystal element 30, the multiple liquid crystal pixels 34 are arrayed in the opening portion 32, the opening portion is illuminated with the illumination light emitted from the light condensing unit to form an image, and the display light of the image is emitted in a light flux form in the emission direction EXD corresponding to the incident direction IN of the illumination light. The enlarging light guide unit 40 has the positive optical element 44 having the positive refractive power and the negative optical element 42 having the negative refracting power. The enlarging light guide unit 40 disposes both of those optical elements on the optical path, and guides the display light from the liquid crystal element toward the projection member so that the virtual image is enlarged. The negative optical element is located closer to the liquid crystal element side on the optical path than the positive optical element.

According to the above disclosure, the enlarging light guide unit guides the display light from the liquid crystal element toward the projection member. In this example, the enlarging light guide unit has the positive optical element having the positive refractive power and the negative optical element having the negative refractive power. The negative optical element is located closer to the liquid crystal element side on the optical path than the positive optical element. The optical system of the HUD device, in which both of the optical elements are located on the optical path, enables to locate the entrance pupil farther away from the liquid crystal element toward the light source unit side with the use of the negative optical element, while the virtual image is enlarged with the use of the positive optical element. As the entrance pupil is located away, such an optical path as to look into the opening portion of the liquid crystal element along the emission direction of the display light from the inside of the visible region can be configured. Therefore, the deviation between the direction of the display light contributing to visual recognition and the emission direction from the liquid crystal element can be reduced. Since the emission direction corresponds to the incident direction of the collimated illumination light to the liquid crystal element, the illumination light can efficiently reach the visible region as the display light of the image while the luminance difference between the liquid crystal pixels can be reduced.

Furthermore, on the optical path between the negative optical element and the liquid crystal element, the direction of the display light contributing to visual recognition approaches the emission direction corresponding to the incident direction of the illumination light collimated by the light condensing unit, thereby being capable of guiding the display light while reducing the size expansion of the negative optical element. As described above, the HUD device that is excellent in visibility of the virtual image while an increase in the physical size is reduced can be provided even in the case where the image is enlarged.

The present disclosure is described based on the embodiments, and it is understood that this disclosure is not limited to the embodiments or the structure. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

What is claimed is:

1. A head-up display device mounted in a mobile object, the head-up display device configured to project a display light toward a projection member of the mobile object and to cause the display light to reach a visible region in the mobile object while causing the projection member to reflect the display light to display a virtual image visible from an inside of the visible region, the head-up display device comprising:
    a light source unit configured to emit an illumination light;
    a light condensing unit configured to cause condensation to collimate the illumination light;
    a liquid crystal element including a plurality of liquid crystal pixels aligned in an opening portion and configured to form an image with the illumination light, which is emitted from the light condensing unit to illuminate the opening portion, and to emit the display light of the image in a light flux shape in an emission direction corresponding to an incident direction of the illumination light; and
    an enlarging light guide unit including a positive optical element having a positive refractive power and a negative optical element having a negative refractive power, wherein
    the optical elements are located on an optical path to guide the display light from the liquid crystal element toward the projection member while enlarging the virtual image, and
    the negative optical element on the optical path is located closer to the liquid crystal element than the positive optical element to locate an entrance pupil farther from the liquid crystal element toward the light source unit.

2. The head-up display device according to claim 1, wherein
    the positive optical element is a concave mirror having a concave curved reflecting surface, and
    the negative optical element is a convex mirror having a convex curved reflecting surface.

3. The head-up display device according to claim 1, wherein
    the light condensing unit includes a compound lens having a compound surface,
    the compound surface has an alternating alignment structure including collimating surfaces and deflecting surfaces alternately continuous with each other,
    the collimating surfaces are configured to cause refraction to collimate the illumination light, and
    the deflecting surfaces are configured to deflect the illumination light toward an opposite side to the refraction caused on the collimating surface.

4. The head-up display device according to claim 1, wherein
    the opening portion is in a rectangular shape having a longitudinal direction and a short direction,
    the light condensing unit includes a condenser lens having a light condensing surface configured to condense the illumination light, and
    the light condensing surface is anamorphic surface in which a curvature in a direction corresponding to the longitudinal direction and a curvature in a direction corresponding to the short direction are different from each other.

5. The head-up display device according to claim 1, wherein
    a pupil distance from the opening portion to the entrance pupil is larger than an interval, which is from a reflecting surface of the positive optical element to a reflecting surface of the negative optical element, or an interval, which is from the reflecting surface of the negative optical element to the opening portion.

6. The head-up display device according to claim 1, wherein
    a principal ray is a light ray passing through a center of the visible region and a center of the opening portion,
    a pupil image forming ray is a light ray along a direction in which a center of the visible region is connected with an end portion of the virtual image between the visible region and the projection member,
    a height of the pupil image forming ray is an interval between the principal ray and the pupil image forming ray along a direction perpendicular to the principal ray, and a height of the pupil image forming ray in the liquid crystal element is a half value of a size of the opening portion.

7. The head-up display device according to claim 1, wherein a normal direction of the opening portion is inclined with respect to the incident direction.

8. The head-up display device according to claim 1, wherein the light condensing unit is placed between the liquid crystal element and the light source unit.

* * * * *